(12) United States Patent
Lin et al.

(10) Patent No.: US 11,739,450 B2
(45) Date of Patent: Aug. 29, 2023

(54) CIRCULAR KNITTING MACHINE FOR PROMPTING KNITTING MACHINE STATUS INSTANTANEOUSLY BASED ON CLOTH SURFACE STATUS OF FABRIC

(71) Applicant: PAI LUNG MACHINERY MILL CO., LTD., New Taipei (TW)

(72) Inventors: Yu-Sheng Lin, New Taipei (TW); Hsien-Te Tsai, Taoyuan (TW)

(73) Assignee: PAI LUNG MACHINERY MILL CO., LTD., New Taipei (TW)

( * ) Notice: Subject to any disclaimer, the term of this patent is extended or adjusted under 35 U.S.C. 154(b) by 61 days.

(21) Appl. No.: 17/242,951

(22) Filed: Apr. 28, 2021

(65) Prior Publication Data
US 2022/0349097 A1 Nov. 3, 2022

(51) Int. Cl.
*D04B 15/66* (2006.01)
*D04B 35/20* (2006.01)
*D04B 9/06* (2006.01)

(52) U.S. Cl.
CPC ............ *D04B 15/665* (2013.01); *D04B 9/06* (2013.01); *D04B 35/20* (2013.01); *G05B 2219/45194* (2013.01)

(58) Field of Classification Search
None
See application file for complete search history.

(56) References Cited

U.S. PATENT DOCUMENTS

| | | | | | |
|---|---|---|---|---|---|
| 3,690,123 | A | * | 9/1972 | Delair | D04B 35/10 66/1 R |
| 3,790,761 | A | * | 2/1974 | Crabtree | D04B 35/10 66/157 |
| 3,940,951 | A | * | 3/1976 | Christiansen | D04B 15/66 66/219 |
| 3,945,224 | A | * | 3/1976 | Billi | D04B 15/665 66/232 |

(Continued)

FOREIGN PATENT DOCUMENTS

| | | |
|---|---|---|
| CN | 102778414 A | 11/2012 |
| CN | 102967606 A | 3/2013 |

(Continued)

*Primary Examiner* — Khoa D Huynh
*Assistant Examiner* — Grace Huang
(74) *Attorney, Agent, or Firm* — Muncy, Geissler, Olds & Lowe, P.C.

(57) ABSTRACT

The invention provides a circular knitting machine for prompting a knitting machine status instantaneously based on a cloth surface status of a fabric, comprising a needle cylinder, a camera module capable of photographing the fabric during doffing, an information processing unit, and an encoder. A camera lens of the camera module does not rotate with the needle cylinder, and a shooting timing of the camera lens is controlled by photographing signals. The information processing unit receives image data generated by the camera module, and compares the images, when there is a difference between the two consecutive image data on a same vertical line, a knitting machine status is prompted. The encoder generates pulse signals when the needle cylinder rotates, the (Continued)

encoder outputs the pulse signals to the camera module or the information processing unit, and the receiver counts the pulse signals to generate the photographing signals.

9 Claims, 6 Drawing Sheets

(56) References Cited

U.S. PATENT DOCUMENTS

| | | | | |
|---|---|---|---|---|
| 4,527,402 | A * | 7/1985 | Swallow | D04B 37/02 66/232 |
| 5,125,034 | A * | 6/1992 | Hudson | G01N 21/8983 356/238.1 |
| 5,333,208 | A * | 7/1994 | Massen | G01N 21/88 382/152 |
| 6,124,803 | A * | 9/2000 | Hamma | D01H 13/32 700/95 |
| 6,263,773 | B1 * | 7/2001 | McAdoo | B27B 31/003 83/13 |
| 6,318,132 | B1 * | 11/2001 | Gutschmit | D04B 35/18 66/157 |
| 7,154,530 | B2 * | 12/2006 | Andrews | B23Q 35/128 348/86 |
| 11,327,454 | B2 * | 5/2022 | Floeder | G05B 19/042 |
| 2022/0005182 | A1 * | 1/2022 | Martins Loureiro | G06T 1/0014 |

FOREIGN PATENT DOCUMENTS

| | | | |
|---|---|---|---|
| CN | 103451846 | A | 12/2013 |
| CN | 103604809 | A | 2/2014 |
| CN | 105044121 | A | 11/2015 |
| CN | 106637655 | A * | 5/2017 |
| CN | 108364291 | A | 8/2018 |
| CN | 108921819 | A | 11/2018 |
| CN | 109696442 | A | 4/2019 |
| CN | 110188806 | A | 8/2019 |
| CN | 110389130 | A | 10/2019 |
| CN | 111812108 | A | 10/2020 |
| EP | 3926084 | A4 * | 12/2021 |
| WO | WO-2022060340 | A1 * | 3/2022 |

* cited by examiner

CIRCULAR KNITTING MACHINE FOR PROMPTING KNITTING MACHINE STATUS INSTANTANEOUSLY BASED ON CLOTH SURFACE STATUS OF FABRIC

FIELD OF THE INVENTION

The invention relates to a circular knitting machine for determining a knitting machine status, and more particularly to a circular knitting machine for prompting a knitting machine status instantaneously based on a cloth surface status of a fabric.

BACKGROUND OF THE INVENTION

The knitting quality of a circular knitting machine depends on whether there are defects in the fabric surface status, and the occurrence of defects is closely related to the stitch status of a plurality of knitting needles on the circular knitting machine. When the butt of one of the knitting needles wears too much, the push-up height of one of the knitting needles will be incapable of reaching the expected height, resulting in the following situations: the latch cannot be fully opened; the old yarn loop has not been cleared (knitting needle knits with double yarns erroneously), the crochet hook cannot hook the new yarn (holes appear in the fabric). On the other hand, when the upper edge of the stitch of one of the knitting needles wears too much, it will cause the following situations: the old yarn ring cannot be reliably released (in addition to the holes in the fabric, abnormal line textures can be found visually on the fabric after knitting); the knitted yarn loop is smaller than the yarn loop knitted in the previous period (abnormal line textures can be found visually on the fabric).

Although there are many technical solutions for testing the quality of fabrics, such as disclosed in CN102778414A, CN102967606A, CN103451846A, CN103604809A, CN108364291A, CN108921819A, CN109696442A, CN110389130A, a point in time for the aforementioned techniques to perform quality testing on knitting is after the knitting machine has finished knitting; even if the fabric is found to be defective, it is impossible to determine which part of the knitting needles of the circular knitting machine needs to be replaced. As a result, the common practice of manufacturers is to replace all the knitting needles on the circular knitting machine after learning that the fabric is defective. Since a quantity of knitting needles on the circular knitting machine is generally 1500-2640, the quantity of knitting needles being replaced at one time is too high, and condition assessment for all the knitting needles does not meet the time cost. This will cause waste of resources and increase the production costs of manufacturers in a disguised form.

In addition to the foregoing, although there are also technical solutions for testing the quality of fabrics on the circular knitting machine, such as disclosed in CN105044121A, CN110188806A, and CN111812108A, the aforementioned techniques still focus only on the testing of fabric quality and do not correlate the testing results with the conditions of the knitting machine, resulting in manufacturers still having to replace all the knitting needles to solve the problem of abnormal knitting quality. Furthermore, all the technical solutions disclosed in the aforementioned patents require the computer that mainly performs identification to perform feature learning on the conditions of the fabric before making judgments. In practice, the circular knitting machine is not designed to be capable of knitting into a single fabric type only; if feature learning is performed at the beginning of production of a fabric type, it is very likely that feature learning will not be completed at the end of the entire fabric production, which obviously does not meet the actual requirements. Furthermore, if it is planned to complete feature learning before production of a fabric, it means that the circular knitting machine needs to knit a large amount of fabrics for the computer to perform feature learning before actual production. For manufacturers, with a large amount of knitted fabrics that need to be regarded as discarded products, the production costs are bound to increase substantially, which does not meet the actual requirements.

Although knitting factories inspect the knitting machine manually, the aforementioned knitting defects cannot be discovered through simple inspections, and the knitting factories will have the problem that knitting defects have already occurred but the knitting machine continues to knit the defective fabrics. The knitting factories have to wait until doffing is over and the fabrics have transported in rolls to the quality inspection department for fabrics inspection before knitting defects can be found. At this time, the knitting factories can only treat the fabrics with weaving defects as discarded products, resulting in a waste of resources.

SUMMARY OF THE INVENTION

A main object of the invention is to solve the problem that the conventional circular knitting machine is incapable of knowing specific positions to be repaired from detection results of a cloth surface status of a fabric.

A secondary object of the invention is to solve the problem derived from the conventional circular knitting machine being incapable of detecting defects synchronously during doffing.

In order to achieve the above objects, the invention provides a circular knitting machine for prompting a knitting machine status instantaneously based on a cloth surface status of a fabric. The circular knitting machine comprises a cam supporting base and a needle cylinder driven to rotate relative to the cam supporting base, and the circular knitting machine is started to knit the fabric which is doffed a side of the needle cylinder opposite to the cam supporting base. The circular knitting machine comprises a camera module, an information processing unit, and an encoder. The camera module photographs the fabric during doffing and generating a plurality of image data, wherein a camera lens of the camera module is not rotated with the needle cylinder, and is controlled by a plurality of photographing signals to photograph the fabric during doffing. The information processing unit receives the plurality of image data and comparing each image data with another image data which is located on a same vertical line of the fabric and photographed in at least one previous revolution of the needle cylinder, wherein a knitting machine status is prompted when a difference occurs. The encoder generates a plurality of pulse signals when the needle cylinder rotating, and the encoder outputs the plurality of pulse signals to one of the camera module and the information processing unit to count the plurality of pulse signals and to generate the plurality of photographing signals, wherein a count value used by the one of the camera module and the information processing unit is a factor of a total amount of the plurality of pulse signals during the needle cylinder rotating one revolution.

In one embodiment, a number of photographing times of the camera module divides a central angle equally and divides a total amount of a plurality of knitting needles belonging to the needle cylinder with no remainder.

In one embodiment, an amount of horizontal loop images included in each of the image data is the same, and each horizontal loop images corresponds to one of the plurality of knitting needles on the circular knitting machine.

In one embodiment, an amount of longitudinal loop images included in each of the image data is the same, and a total length of the longitudinal loop images is proportional to an amount of doffing in one revolution of the needle cylinder.

In one embodiment, the circular knitting machine comprises a mounting arm provided for the camera lens being suspended within an area surrounded by the needle cylinder.

In one embodiment, the mounting arm is offset from a center of the area surrounded by the needle cylinder.

In one embodiment, the information processing unit compares chromogenic pixels between the plurality image data.

Accordingly, comparing with the conventional techniques, the invention has the following features. After the camera module of the invention is installed, the camera lens belonging to the camera module does not rotate with the needle cylinder, trigger of shooting of the camera lens is based on the shooting signals generated by counting the pulse signals with the camera module or the information processing unit, and the image data are generated by photographing the fabric during doffing with the camera lens. The information processing unit does not need to perform deep learning required to determine the defects of the fabric in advance, but compares each of the image data with another one of the image data that is located on a same vertical line and photographed in at least one previous revolution of the needle cylinder, which greatly reduces a computational capability required for the information processing unit, which means that the hardware requirements are reduced. However, although the invention reduces a capability required for computing, it does not reduce a determining efficiency. Compared with the prior art, the invention is capable of determining defects generated on the fabric more quickly, so that an operator can immediately eliminate a cause. In addition, the invention is capable of prompting the operator which part of the circular knitting machine has a problem and should be replaced only based on one of the abnormal image data, and specifically solving the problem of waste of resources caused by the existing technical skills being incapable of checking a status of the knitting needles belonging to the circular knitting machine one by one, and only capable of replacing all the knitting needles. In addition, the invention is capable of finding defects on the fabric immediately, so that the operator can stop the circular knitting machine, immediately prevent continuous production of the defective fabric, and resume production after a cause of defects is eliminated, thereby avoiding the problem of excessive discarded products caused by judging defects after the fabric is completed in the current implementation process of the prior art.

DETAILED DESCRIPTION OF THE PREFERRED EMBODIMENTS

Figure 1:
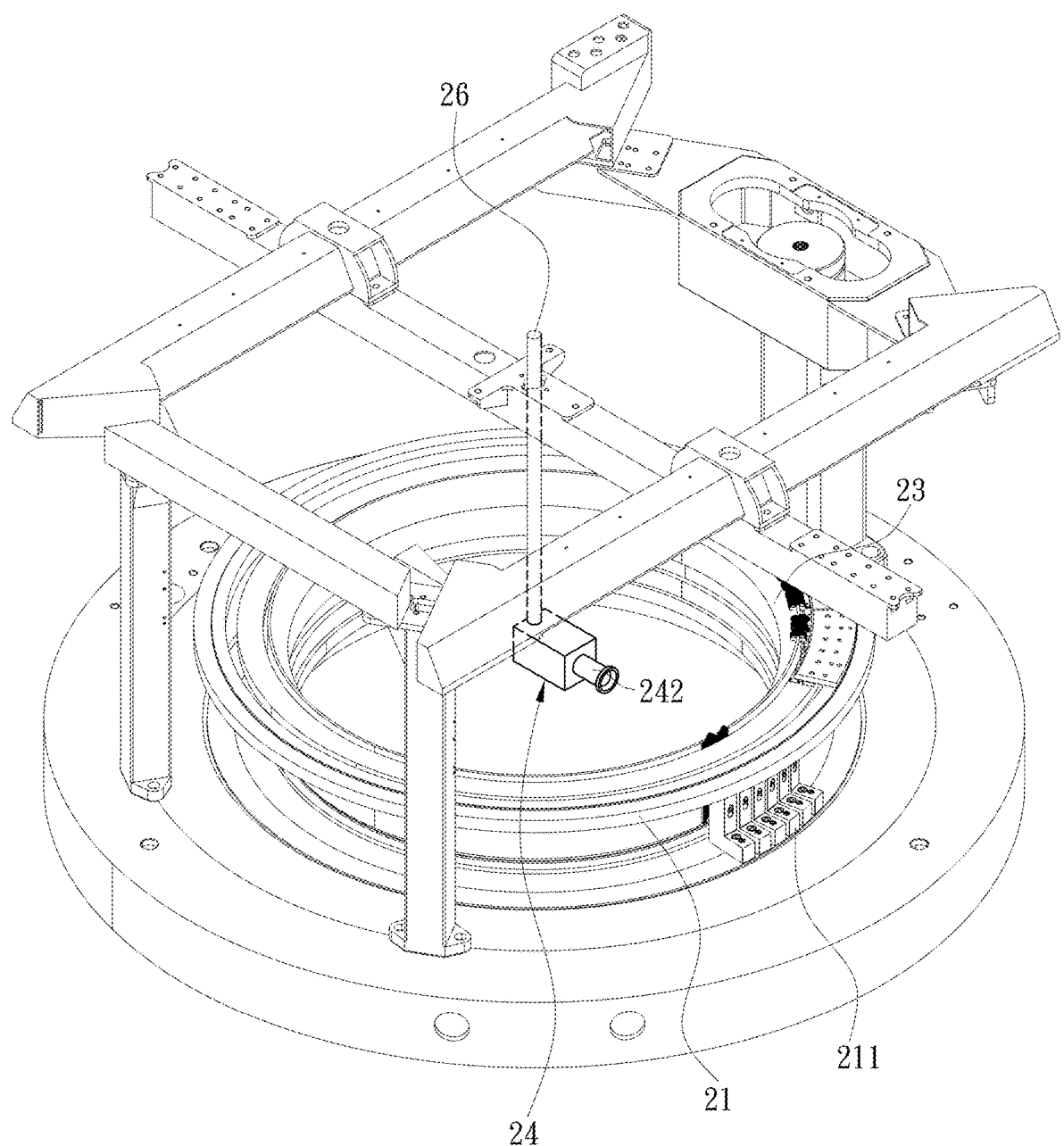
FIG. 1 is a perspective view of partial structures of a circular knitting machine according to an embodiment of the invention.
Figure 2:
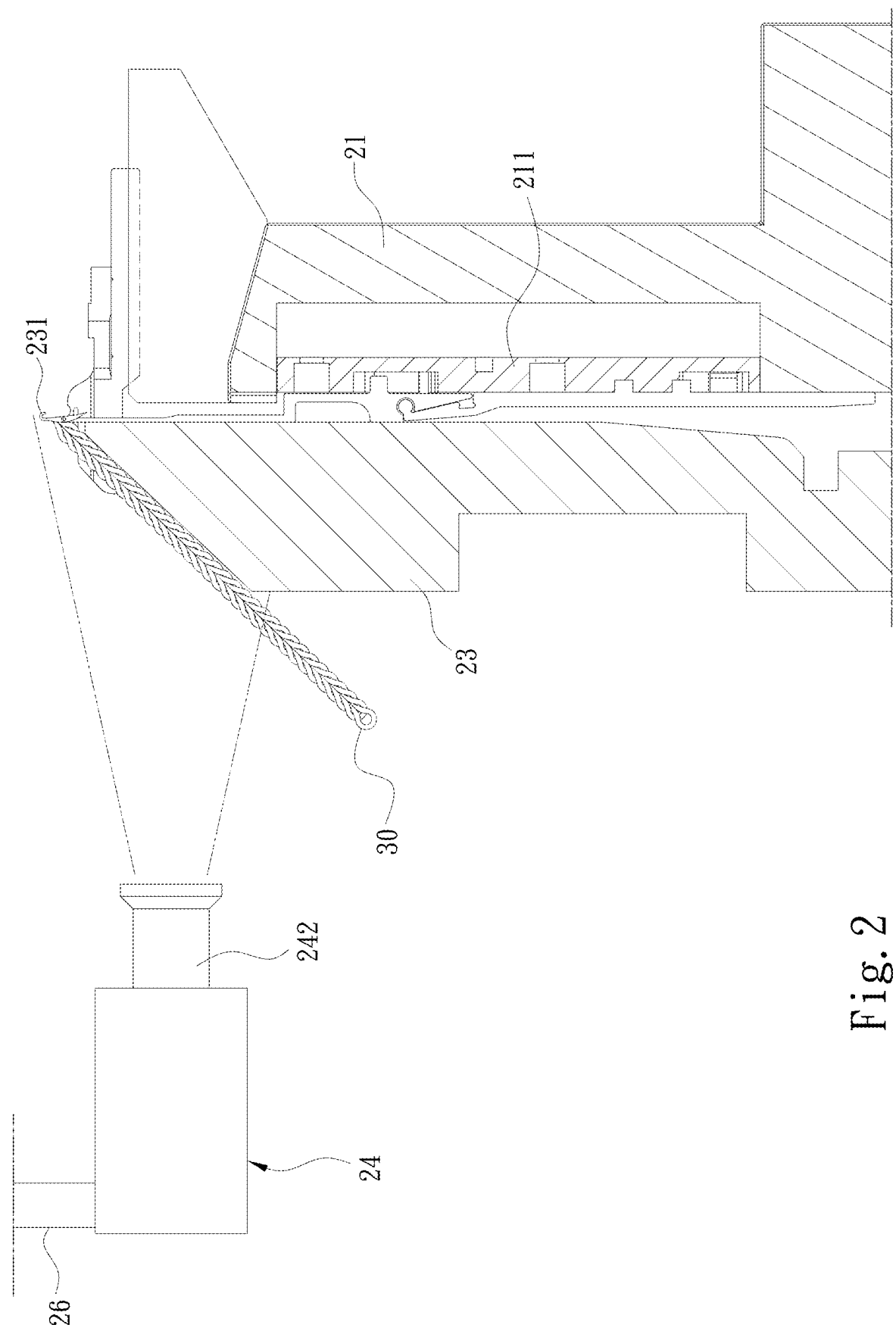
FIG. 2 is a cross-sectional view of partial structures of the circular knitting machine according to an embodiment of the invention.

The detailed description and technical contents of the invention are described below with reference to the drawings.

Please refer to FIG. 1, FIG. 2, FIG. 3, and FIG. 4. The invention provides a circular knitting machine 20 which is capable of prompting a knitting machine status instantaneously based on a cloth surface status produced during knitting a fabric 30. Herein, implementation of the circular knitting machine 20 is explained below. The circular knitting machine 20 comprises a cam supporting base 21, an encoder 22, and a needle cylinder 23. The basic configurations of the cam supporting base 21 and the needle cylinder 23 are circular, and the needle cylinder 23 is disposed on an inner ring of the cam supporting base 21. The needle cylinder 23 is driven by a driving member (not shown in the figures) to rotate relative to the cam supporting base 21, and a plurality of knitting needles 231 on the needle cylinder 23 are guided to perform a knitting action by a plurality of cam sets 211 of the cam supporting base 21 when the needle cylinder 23 rotates. In addition, when the circular knitting machine 20 is started, the fabric 30 is knitted and doffed from a side of the needle cylinder 23 opposite to the cam supporting base 21. The encoder 22 generates a plurality of pulse signals 221 when the needle cylinder 23 rotates, wherein the plurality of pulse signals 221 are generated regularly and continuously, and the plurality of pulse signals 221 generated by the encoder 22 are constant when the needle cylinder 23 rotates one revolution. In the technical field of the circular knitting machine 20, the plurality of pulse signals 221 are only used to determine a rotation angle of the needle cylinder 23.

The circular knitting machine 20 of the invention further comprises a camera module 24 and an information processing unit 25. The camera module 24 photographs the fabric 30 during doffing and generates a plurality of image data 241. More specifically, a camera lens 242 of the camera module 24 is disposed at a position that can photograph the fabric 30 during doffing. In one embodiment, the circular knitting machine 20 comprises a mounting arm 26 provided for the camera lens 242 being suspended within an area surrounded by the needle cylinder 23, wherein the mounting arm 26 can be disposed on a yarn feeding ring (not shown in the figures) of the circular knitting machine 20, or installed on an external structure not belonging to the circular knitting machine 20. Considering shooting distance and photographing quality of the camera lens 242, the mounting arm 26 is not limited to being located at a center of the area surrounded by the needle cylinder 23, but can be offset from a center. In the invention, the camera lens 242 is not rotated with the needle cylinder 23, that is to say, the camera lens 242 is fixed at one place to photograph objects passing by the camera lens 242. The camera lens 242 does not continuously photograph the fabric 30, and therefore does not produce film data. The camera lens 242 only photographs the fabric 30 during doffing when receiving a plurality of photographing signals 27.

Figure 3:
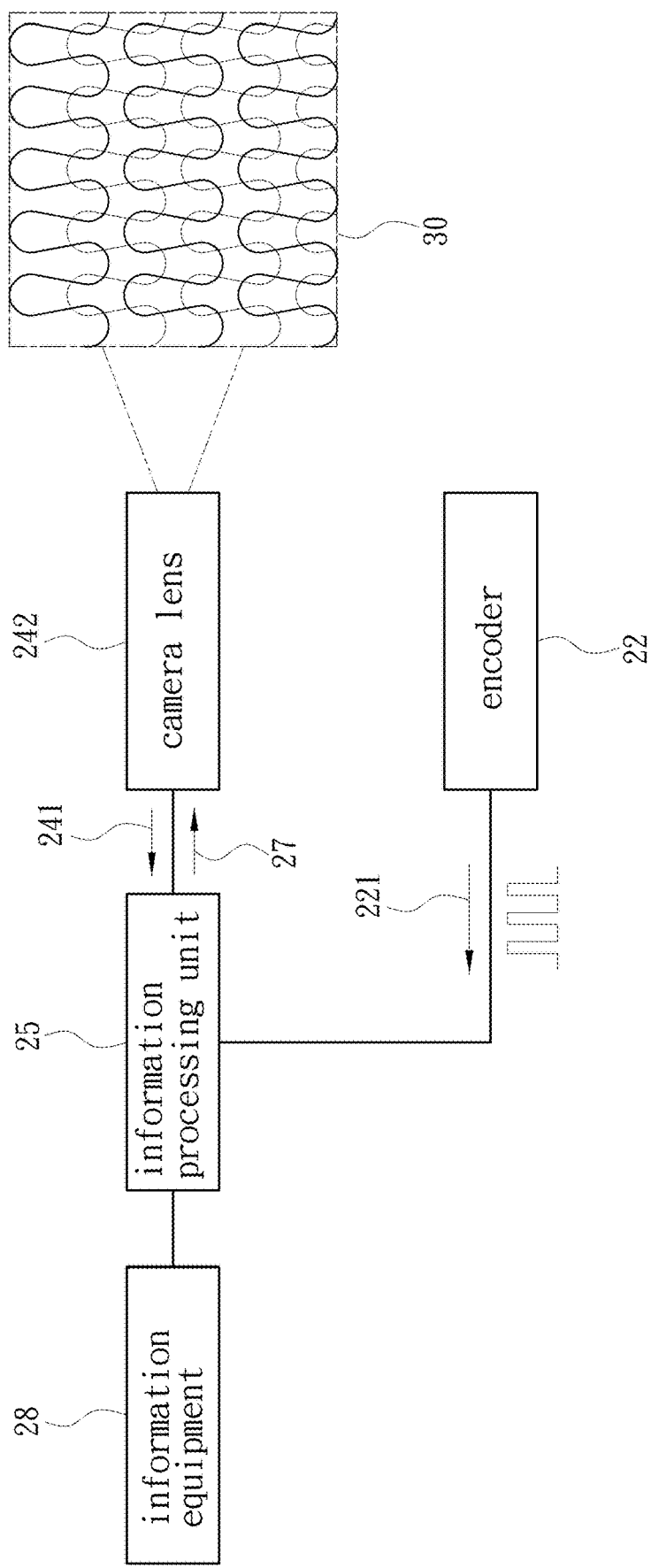
FIG. 3 is a block diagram of implementation units of the circular knitting machine according to an embodiment of the invention.
Figure 4:
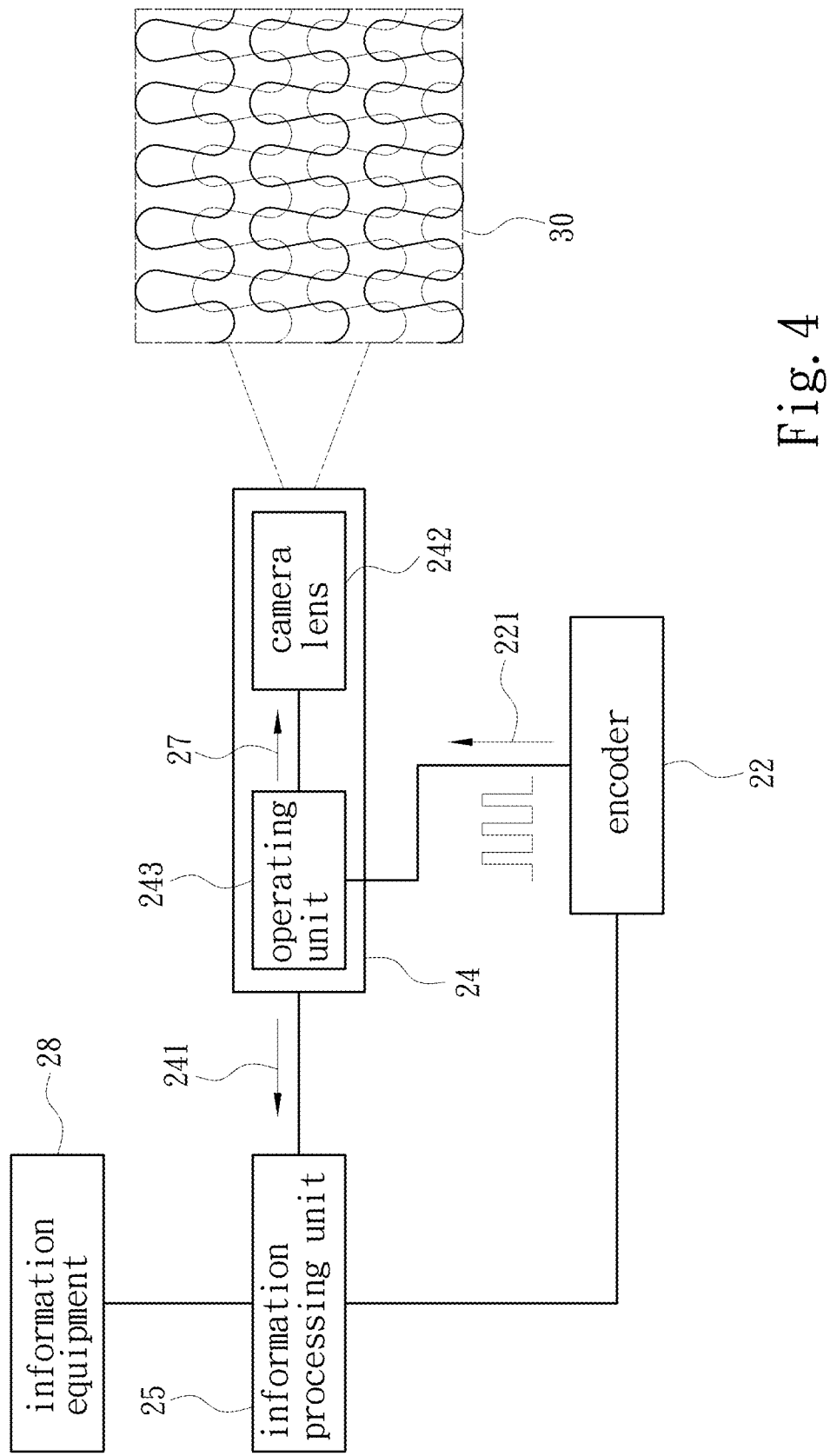
FIG. 4 is a block diagram of implementation units of the circular knitting machine according to another embodiment of the invention.

Please refer to FIG. 3 and FIG. 4, the explanation of the plurality of photographing signals 27 is described as follow. Firstly, in one embodiment, the camera module 24 is provided with an operating unit 243 which calculates received information based on a memorized operating program. Besides, the information processing unit 25 is implemented as a central control module of the circular knitting machine 20, and the information processing unit 25 is connected to the camera module 24 in a wired or wireless manner to receive the plurality of image data 241 generated by the camera module 24. Further, the plurality of pulse signals 221 generated by the encoder 22 are not only used to control the circular knitting machine 20 originally, but are also output to the camera module 24 or the information processing unit 25, wherein it should be noticed that the prerequisite for selecting to output the plurality of pulse signals 221 to the camera module 24 is that the camera module 24 is provided with the operating unit 243. The camera module 24 or the information processing unit 25 is a receiver of the plurality of pulse signals 221 to count the plurality of pulse signals 221 and generate the plurality of photographing signals 27, wherein a count value used by the receiver is a factor of a total amount of the plurality of pulse signals 221 during the needle cylinder 23 rotating one revolution. For example, a total amount of the plurality of pulse signals 221 generated by the encoder 22 during one revolution of the needle cylinder 23 is "2640", so that the count value can be selected as a value which is able to divide "2640" with no remainder, such as "88". In this way, the receiver (the camera module 24 or the information processing unit 25) will generate one of the plurality of photographing signals 27 whenever receiving eighty-eight pulse signals 221. Accordingly, a number of photographing times of the camera module 24 is a quotient obtained by dividing the total amount of the plurality of pulse signals 221 by the count value. For instance, a number of photographing times is "30" in the previous example. However, in order to make the time of photographing times of the camera module 24 the same in each revolution of the needle cylinder 23, the number of photographing times needs to be capable of dividing a central angle equally. Preferably, the number of photographing times divides a total amount of the plurality of knitting needles 231 belonging to the needle cylinder 23 with no remainder, so that the plurality image data 241 comprises the knitting needles 231 equally. The information processing unit 25 prompts an operator that which part of the plurality of knitting needles 231 is abnormal based on one of the plurality of image data 241 where abnormality occurs. As described in the previous example, a total amount of the knitting needles 231 is "2640", and a number of photographing times of the camera module 24 is "30", which means that the camera module 24 will take one photograph when the needle cylinder 23 rotates every twelve degrees, and a total amount of the plurality of image data 241 generated by the needle cylinder 23 in one revolution is "30".

Figure 5:
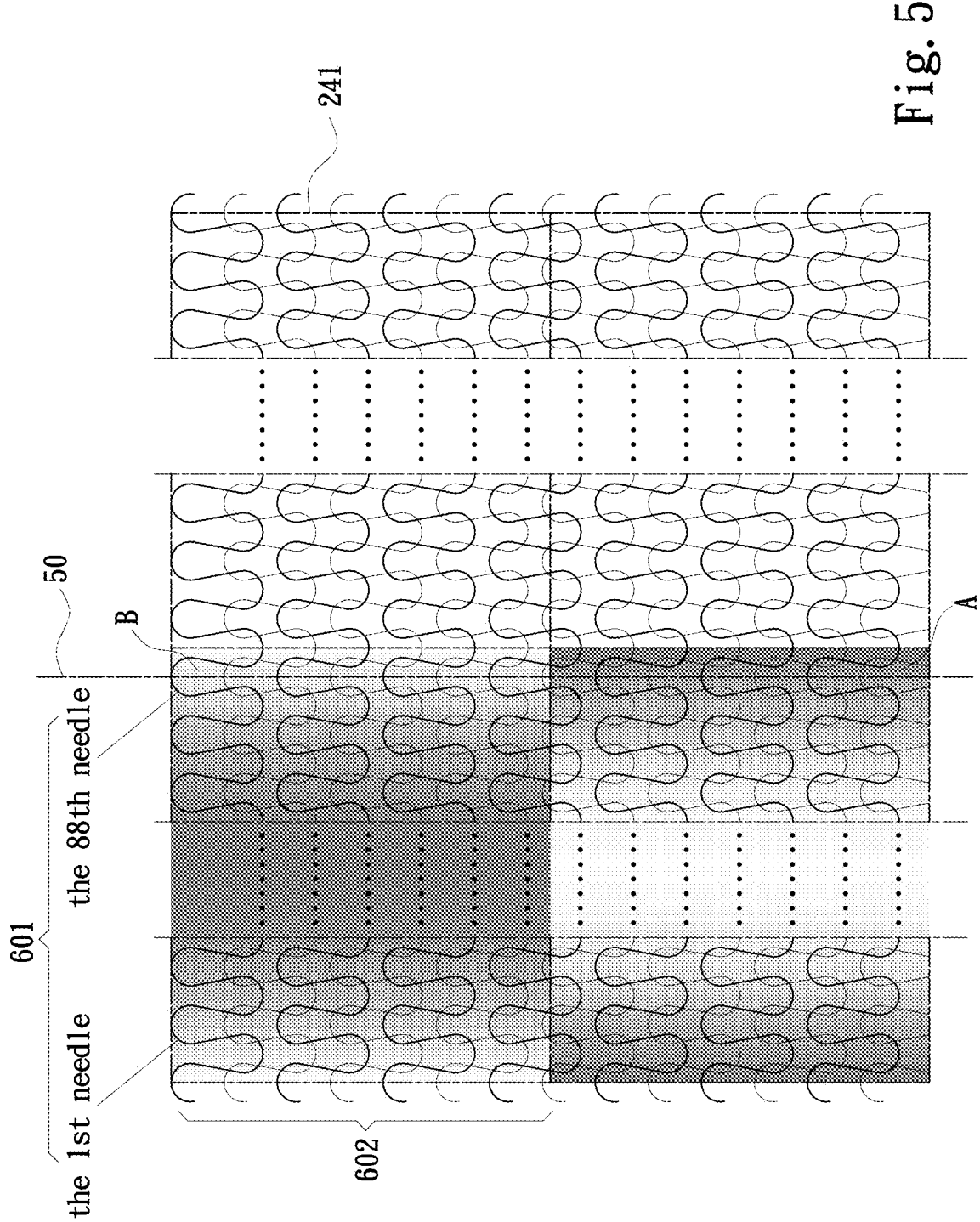
FIG. 5 is a schematic diagram of a fabric according to an embodiment of the invention.

In this way, each of the plurality of image data 241 comprises eighty-eight knitting needles 231, in other words, one of the plurality of image data 241 comprises the 1st needle to the 88th needle of the knitting needles 231, the other one of the image data 241 successively generated comprises the 89th needle to the 176th needle of the knitting needles 231. Further referring to FIG. 5, an amount of horizontal loop images 601 included in each of the plurality of image data 241 is the same, and each of the horizontal loop images 601 corresponds to one of the plurality of knitting needles 231 on the circular knitting machine 20. In addition, an amount of longitudinal loop images 602 included in each of the plurality of the image data 241 is the same, and a total length of the longitudinal loop images 602 is proportional to an amount of doffing in one revolution of the needle cylinder 23. In this way, an object to be repaired can be quickly found based on one of the plurality of image data 241 in which a difference is determined.

In addition, the information processing unit 25 performs image comparison on the plurality of image data 241 based on a pre-memorized execution procedure, and the information processing unit 25 compares each of the plurality of image data 241 (marked as A in FIG. 5) with the other one of the plurality of image data 241 (marked as B in FIG. 5) that is located on a same vertical line 50 and photographed by the camera module 24 in a previous revolution of the needle cylinder 23. That is, if one of the plurality of image data 241 to be compared is the 24th image data 241 captured by the camera module 24 during a second revolution of the needle cylinder 23, the other one of the plurality of image data 241 in comparison is the 24th image data 241 captured by the camera module 24 during a first revolution of the needle cylinder 23, and the two image data 241 are continuously formed on the vertical line 50, representing continuous doffing of the fabric 30 during a knitting process. After the information processing unit 25 compares the foregoing two image data 241, a knitting machine status is prompted once a difference is found. Specifically, the comparison referred in the invention means to compare chromogenic pixels of two of the plurality of image data 241 to be compared. Please refer to FIG. 6 as an example that shows one embodiment that the fabric 30 comprises defects. A loose loop area 603 can be directly observed from FIG. 6, and the rest of the fabric 30 is a normal loop area 604. Images of the loose loop area 603 are different from images of the normal loop area 604, and all the image data 241 are electronic data. Between the plurality of image data 241, the chromogenic pixels corresponding to the same location of the fabric are different. For example, the plurality of image data 241 define color rendering of each of the chromogenic pixels with trichromatic light modes (RGB). Under normal conditions, RGB parameters of the chromogenic pixels on a part of one of the plurality of image data 241 are: R227, G23, B13. When the RGB parameters of the chromogenic pixels on a corresponding part of another image data 241 are changed to R41, G36, B33, the information processing unit 25 determines that there is a difference. It should be understood that the examples mentioned in this specification are only illustrations. In practice, the information processing unit 25 performs similar or identical comparisons with a wide range of image feature values. The technical method of image comparison is not an emphasis of the application of the invention, but can be implemented with any existing technique that can achieve a same effect.

Figure 6:
FIG. 6 is a schematic diagram of image data containing fabric defects according to an embodiment of the invention.

Furthermore, if the latest shooting information of the camera module 24 is shown as FIG. 6, the information processing unit 25 compares image data 241 of FIG. 6 with the other image data 241 (not shown in the figure) on the same vertical line 50 and photographed in a previous revolution of the needle cylinder 23. In one embodiment, assuming that the other image data 241 mentioned above is normal knitting, none of the loose loop area 603 will be existed. The chromogenic pixels of the loose loop area 603 in FIG. 6 are different from the chromogenic pixels of the normal loop area 604, and after the information processing unit 25 compares all parts of the two image data 241, the information processing unit 25 determines that the fabric 30 has quality defects if a difference (color rendering difference) between two of the image data 241 is greater than an allowable value, and a knitting machine status is prompted. The prompt referred to herein can be achieved by a variety of technical solutions, such as driving a prompt lamp or a prompt bell on the circular knitting machine 20 to generate an action, or the information processing unit 25 transmits a signal to an information equipment 28 via a wired or wireless method, and the signal is read by an operator. The information equipment 28 can be a terminal equipment held by the operator, or a server that can be communicatively connected with the terminal equipment. In addition to the foregoing, the information processing unit 25 can also be set to immediately request the encoder 22 to stop sending a signal to drive the needle cylinder 23 when a cloth surface status of the fabric 30 is detected to be abnormal, so that the circular knitting machine 20 is temporarily shut down to prevent the fabric 30 of poor quality from being continuously knitted.

What is claimed is:

1. A circular knitting machine for prompting a knitting machine status instantaneously based on a cloth surface status of a fabric, the circular knitting machine comprising a cam supporting base and a needle cylinder driven to rotate relative to the cam supporting base, and the circular knitting machine being started to knit the fabric which is doffed a side of the needle cylinder opposite to the cam supporting base, the circular knitting machine comprising:
   a camera module, photographing the fabric during doffing and generating a plurality of image data, wherein a camera lens of the camera module is not rotated with the needle cylinder, and is controlled by a plurality of photographing signals to photograph the fabric during doffing;
   an information processing unit, receiving the plurality of image data and comparing each image data with another image data which is located on a same vertical line of the fabric and photographed in at least one previous revolution of the needle cylinder, wherein a knitting machine status is prompted when a difference occurs; and
   an encoder, generating a plurality of pulse signals when the needle cylinder is rotating, and the encoder outputting the plurality of pulse signals to one of the camera module and the information processing unit to count the plurality of pulse signals and to generate the plurality of photographing signals, wherein a count value used by the one of the camera module and the information processing unit is a factor of a total amount of the plurality of pulse signals during the needle cylinder rotating one revolution.

2. The circular knitting machine for prompting the knitting machine status instantaneously based on the cloth surface status of the fabric as claimed in claim 1, wherein a number of photographing times of the camera module divides a central angle equally and divides a total amount of a plurality of knitting needles belonging to the needle cylinder with no remainder.

3. The circular knitting machine for prompting the knitting machine status instantaneously based on the cloth surface status of the fabric as claimed in claim 1, wherein an amount of horizontal loop images included in each of the plurality of image data is the same, and each of the horizontal loop images corresponds to one of the plurality of knitting needles on the circular knitting machine.

4. The circular knitting machine for prompting the knitting machine status instantaneously based on the cloth surface status of the fabric as claimed in claim 3, wherein an amount of longitudinal loop images included in each of the plurality of image data is the same, and a total length of the longitudinal loop images is proportional to an amount of doffing in one revolution of the needle cylinder.

5. The circular knitting machine for prompting the knitting machine status instantaneously based on the cloth surface status of the fabric as claimed in claim 4, wherein the circular knitting machine comprises a mounting arm provided for the camera lens being suspended within an area surrounded by the needle cylinder.

6. The circular knitting machine for prompting the knitting machine status instantaneously based on the cloth surface status of the fabric as claimed in claim 5, wherein the mounting arm is offset from a center of the area surrounded by the needle cylinder.

7. The circular knitting machine for prompting the knitting machine status instantaneously based on the cloth surface status of the fabric as claimed in claim 1, wherein the circular knitting machine comprises a mounting arm provided for the camera lens being suspended within an area surrounded by the needle cylinder.

8. The circular knitting machine for prompting the knitting machine status instantaneously based on the cloth surface status of the fabric as claimed in claim 7, wherein the mounting arm is offset from a center of the area surrounded by the needle cylinder.

9. The circular knitting machine for prompting the knitting machine status instantaneously based on the cloth surface status of the fabric as claimed in claim 8, wherein the information processing unit compares chromogenic pixels between the plurality of image data.

* * * * *